(12) United States Patent
Adams

(10) Patent No.: US 7,096,810 B1
(45) Date of Patent: Aug. 29, 2006

(54) BOW MOUNTED VESSEL PROPULSION SYSTEM

(76) Inventor: Robert D. Adams, 9 Georgian Dr., Cinnaminson, NJ (US) 08077

( * ) Notice: Subject to any disclaimer, the term of this patent is extended or adjusted under 35 U.S.C. 154(b) by 0 days.

(21) Appl. No.: 11/230,383

(22) Filed: Sep. 20, 2005

(51) Int. Cl.
*B63B 1/34* (2006.01)
(52) U.S. Cl. .................................. 114/67 A; 440/79
(58) Field of Classification Search .............. 114/67 A; 440/66, 79
See application file for complete search history.

(56) References Cited

U.S. PATENT DOCUMENTS

| | | | | |
|---|---|---|---|---|
| 1,459 | A | * | 12/1839 | Beecher ..................... 440/48 |
| 2,386,362 | A | * | 10/1945 | Soldner ...................... 440/59 |
| 3,288,100 | A | * | 11/1966 | Cox et al. ................... 440/44 |
| 3,472,193 | A | * | 10/1969 | Bernaerts ................ 114/67 A |
| 3,702,598 | A | * | 11/1972 | Szptyman ............... 114/67 A |
| 5,344,349 | A | * | 9/1994 | Meisenburg et al. ......... 440/80 |

FOREIGN PATENT DOCUMENTS

| | | | |
|---|---|---|---|
| JP | 6042189 | * | 3/1985 |
| JP | 6144345 | * | 5/1994 |

* cited by examiner

*Primary Examiner*—Ed Swinehart
(74) *Attorney, Agent, or Firm*—Stuart M. Goldstein

(57) ABSTRACT

A bow mounted vessel propulsion system is designed to exploit the characteristics of a self-producing vessel lubricating boundary layer of air or air bubbles formed during water surface interaction by the vessel's hull during vessel movement. This boundary layer of air/air bubbles will be produced at the bow of the vessel and, during forward motion, is superimposed upon the surface of the water as the vessel's hull passes over, reducing the frictional drag of the hull as it moves across and through the water. The system has a propulsion means such as a water surface-piercing propeller or water jet nozzles, which will propel the vessel forward and, at the same time, by action of propeller rotation (drawing air into and intermixing) in the water or water jet movement, will create the air bubbles which produce the hull-lubricating phenomenon. The hull is a substantially flat-bottomed planning hull with two linear rails on each lengthwise outer edge of the bottom surface of the hull. The rails extend downward into the water at a sufficient depth to be able to keep the boundary layer of air bubbles from escaping out from the sides of the hull bottom when the vessel is in forward motion.

18 Claims, 14 Drawing Sheets

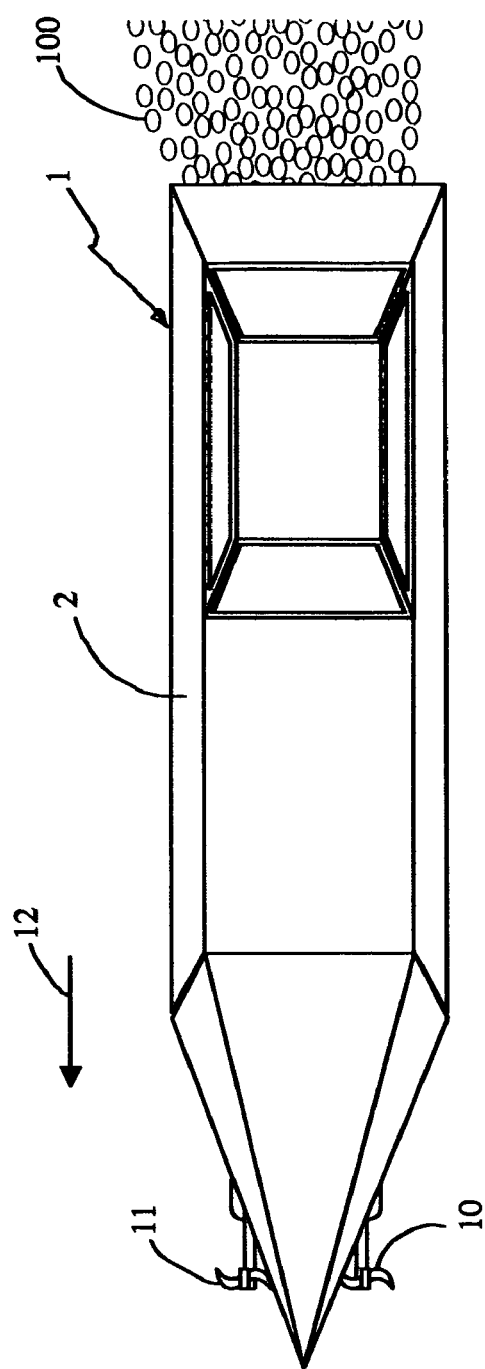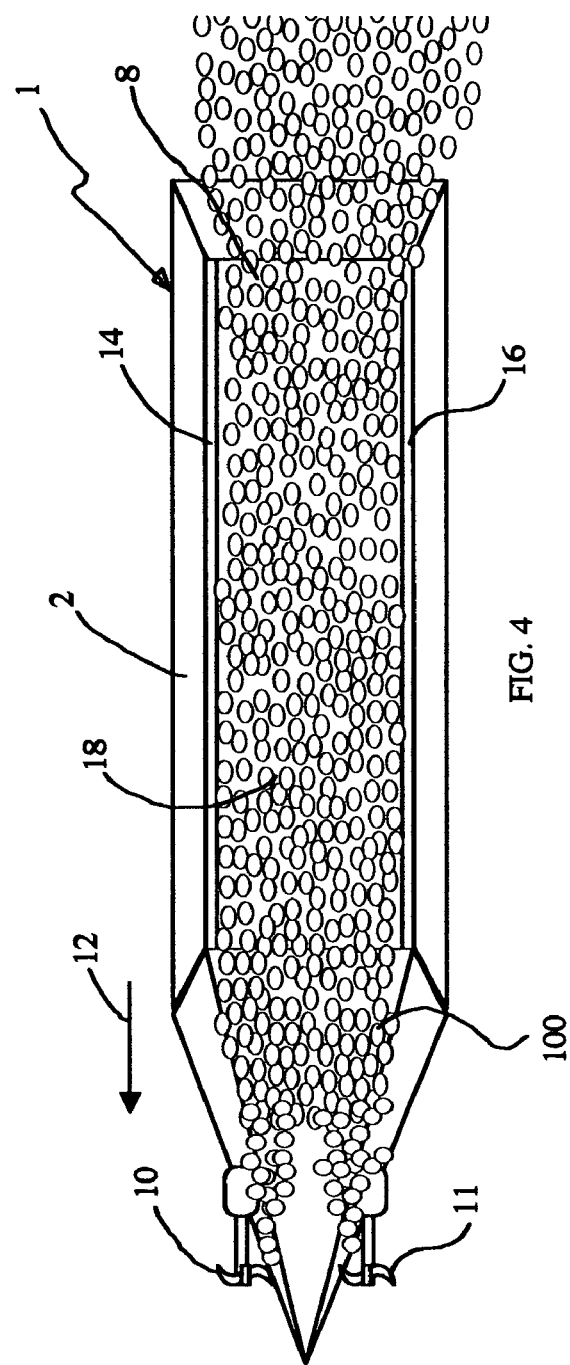

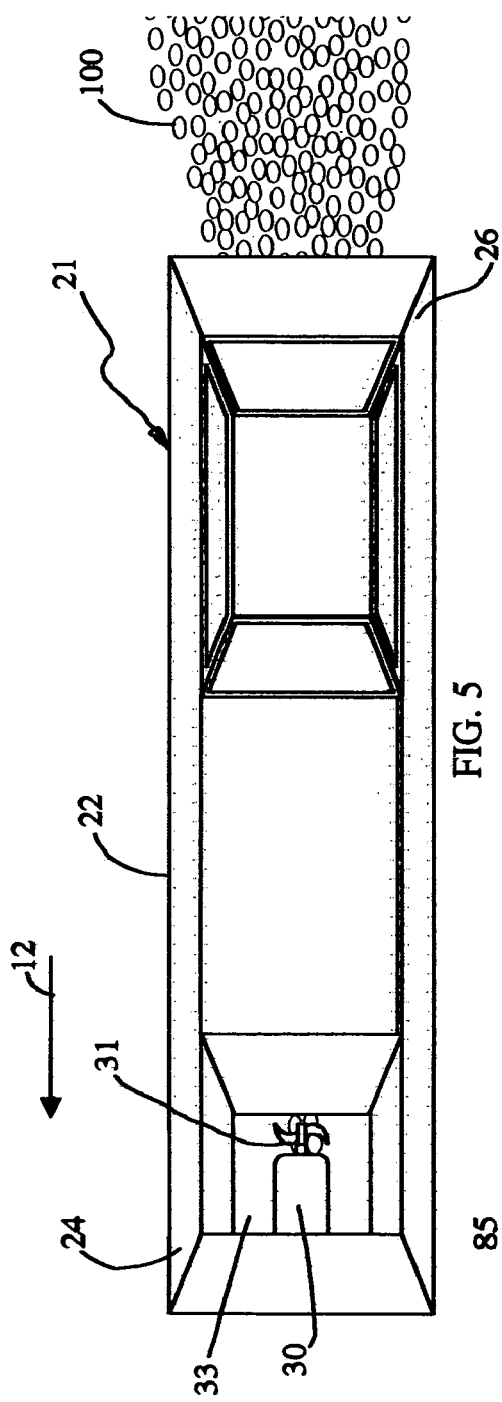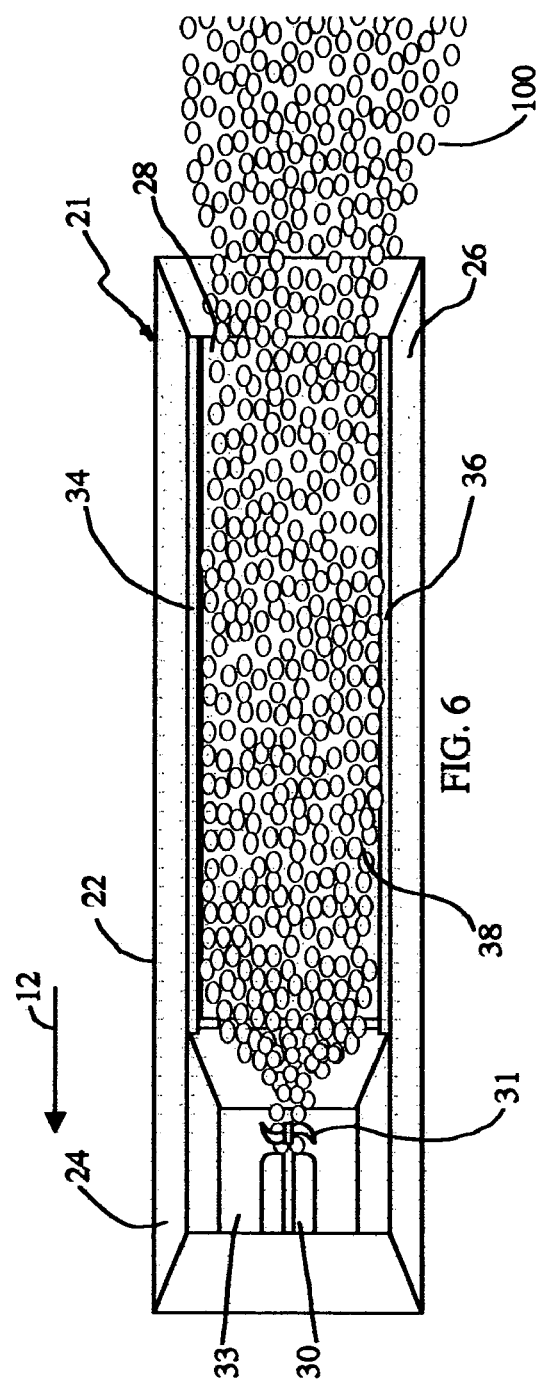

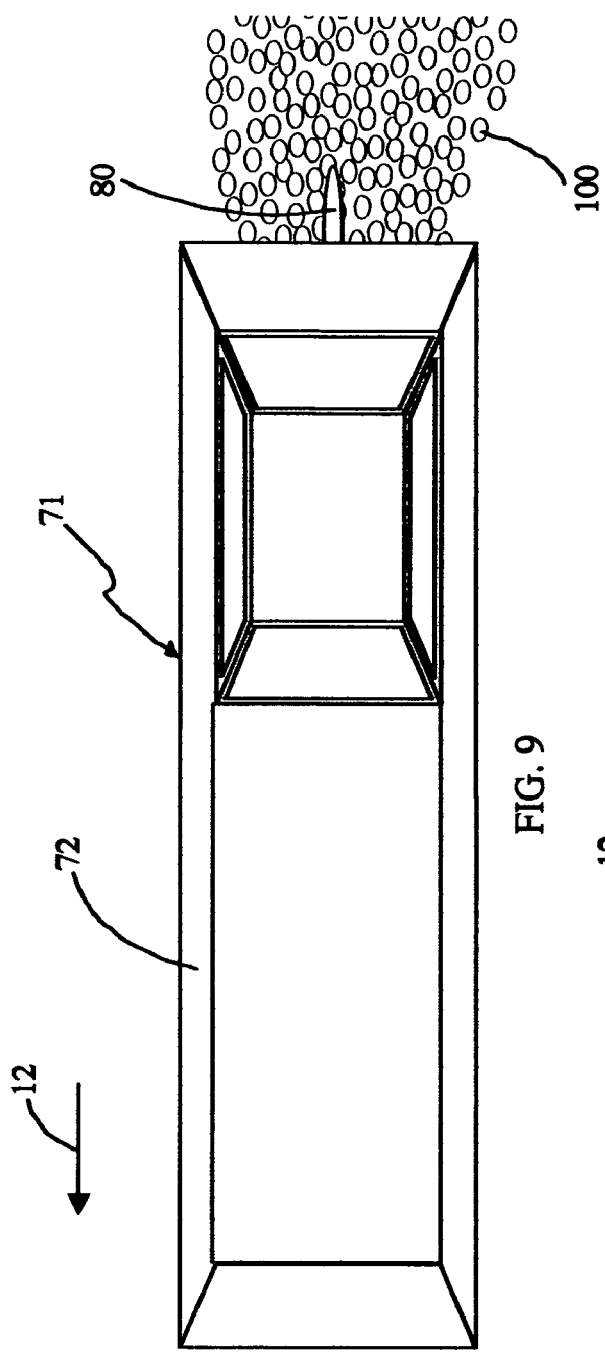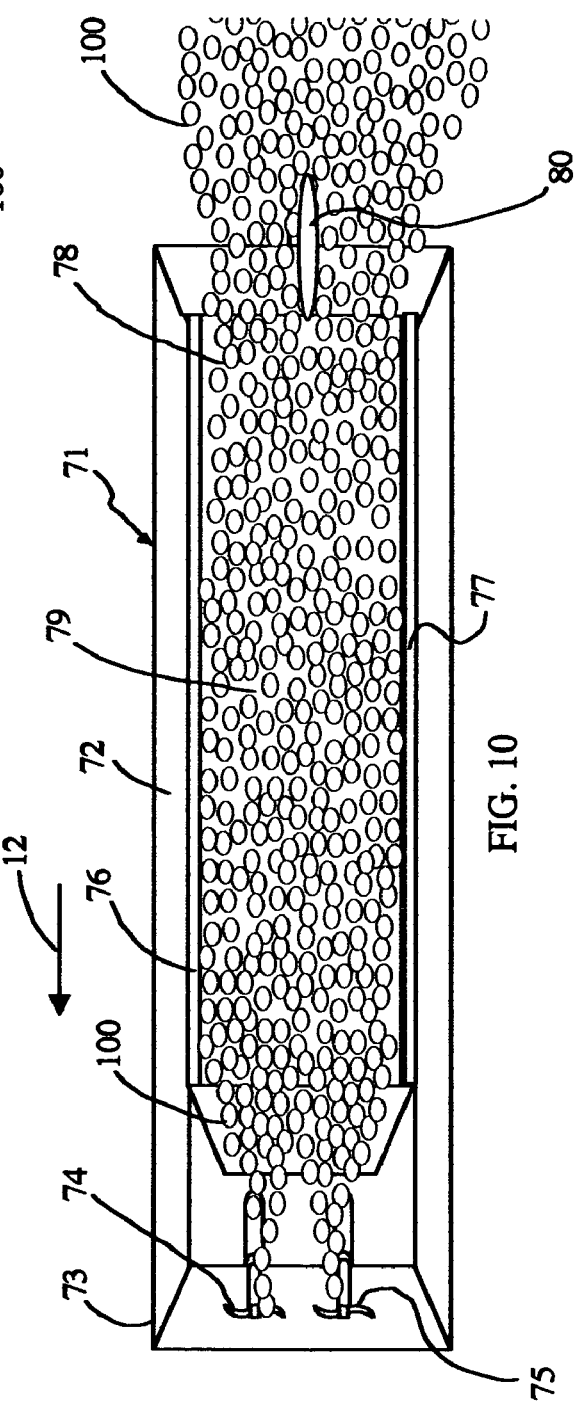

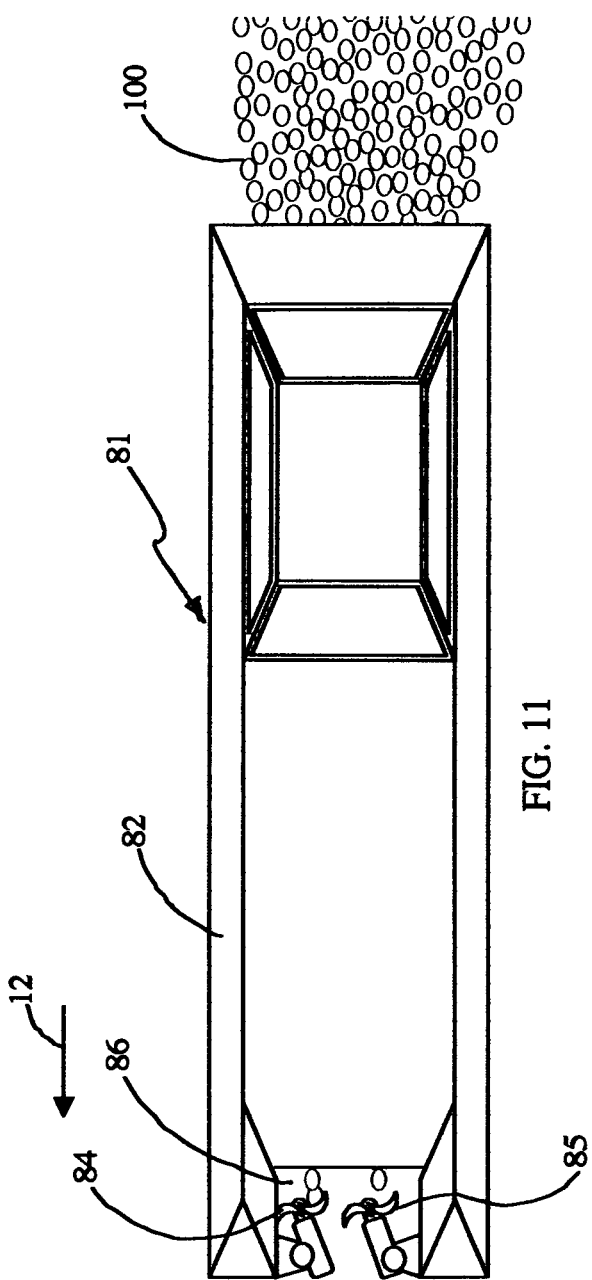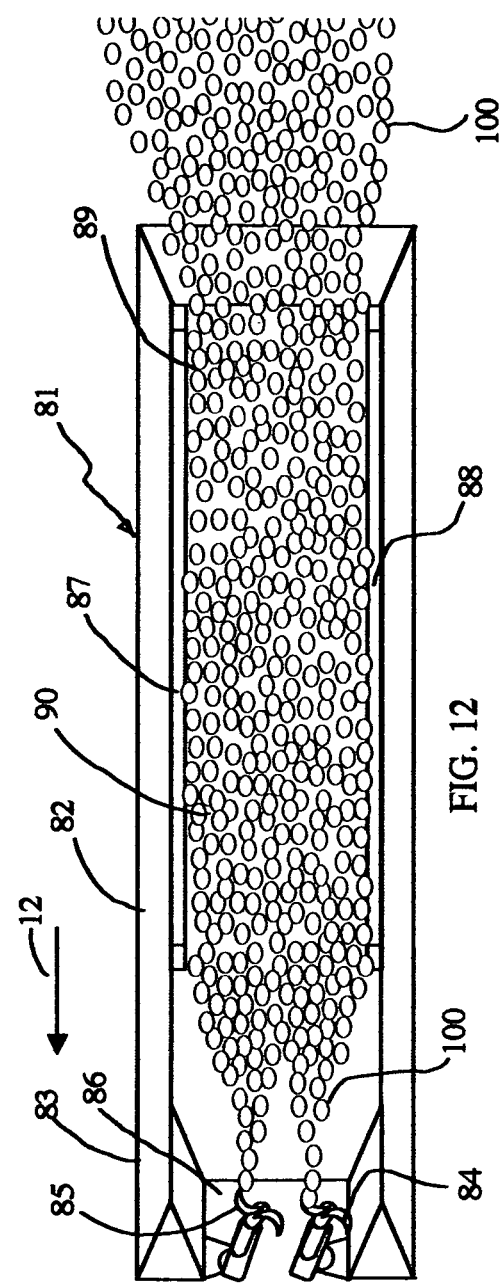

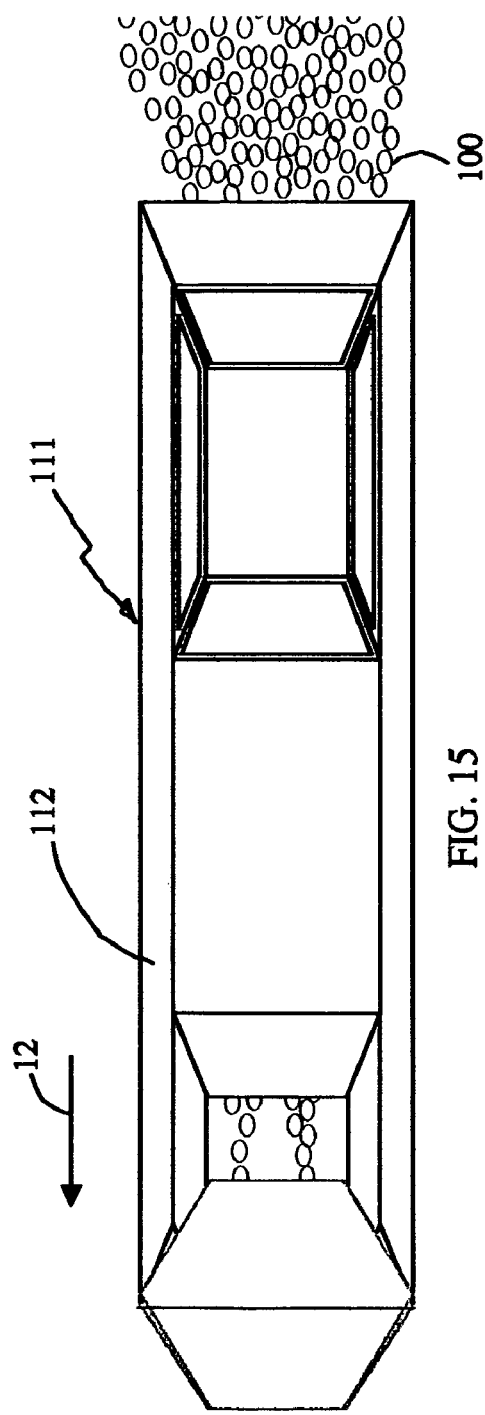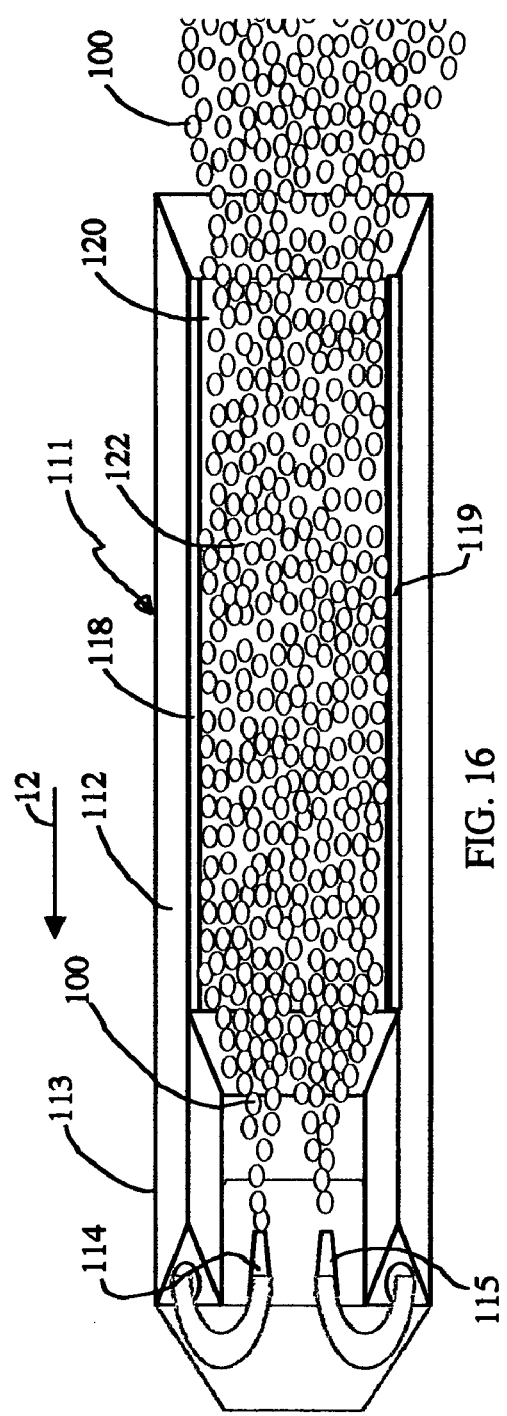

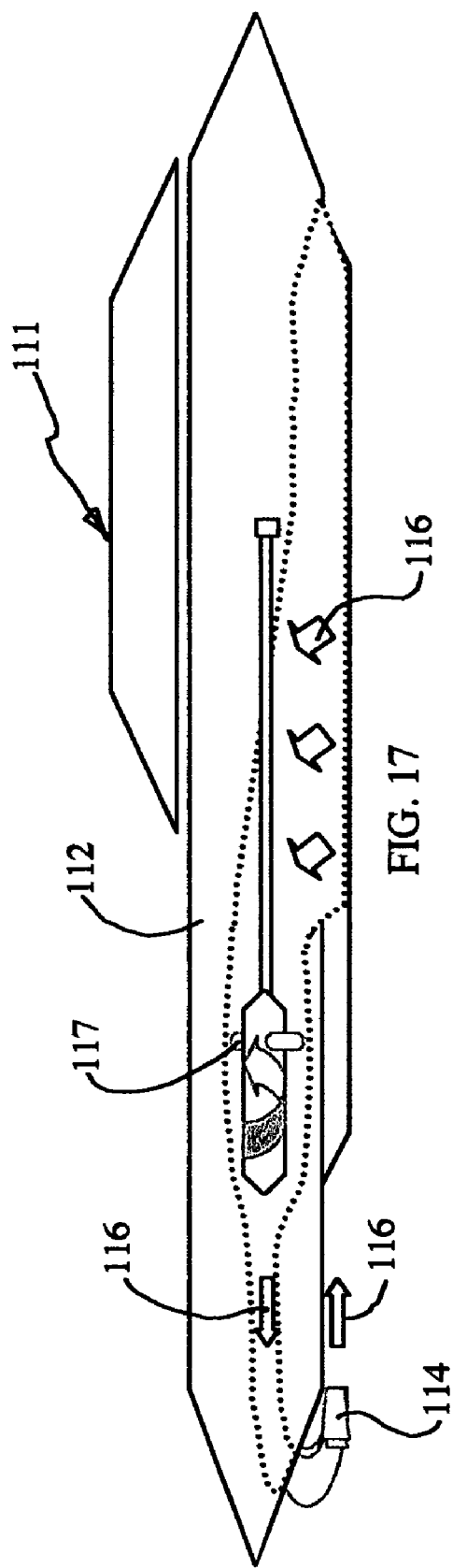

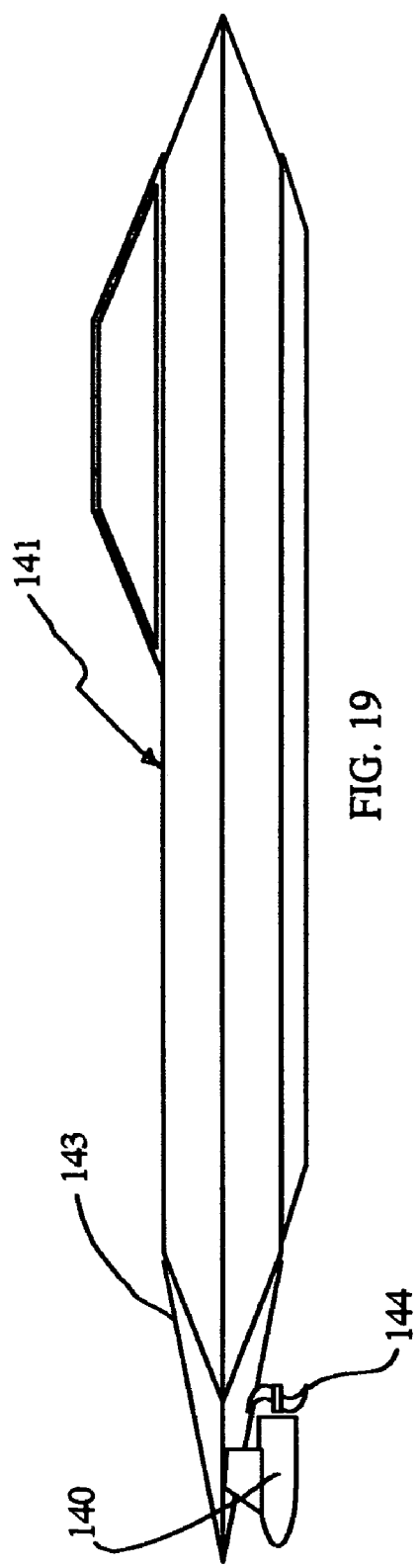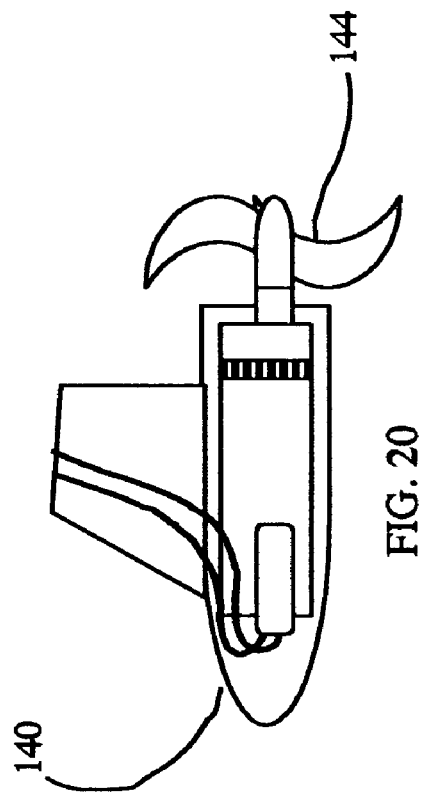
FIG. 19
FIG. 20

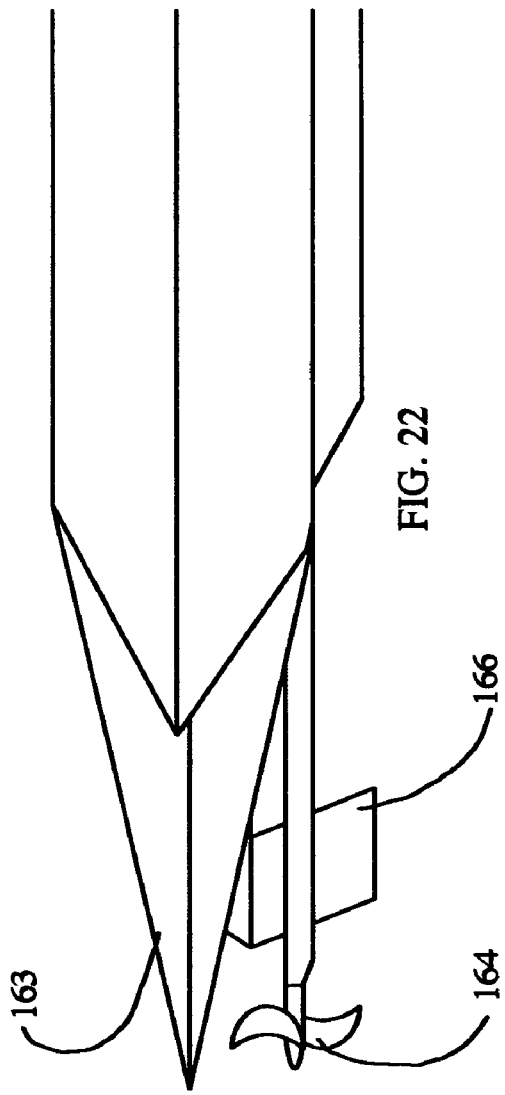
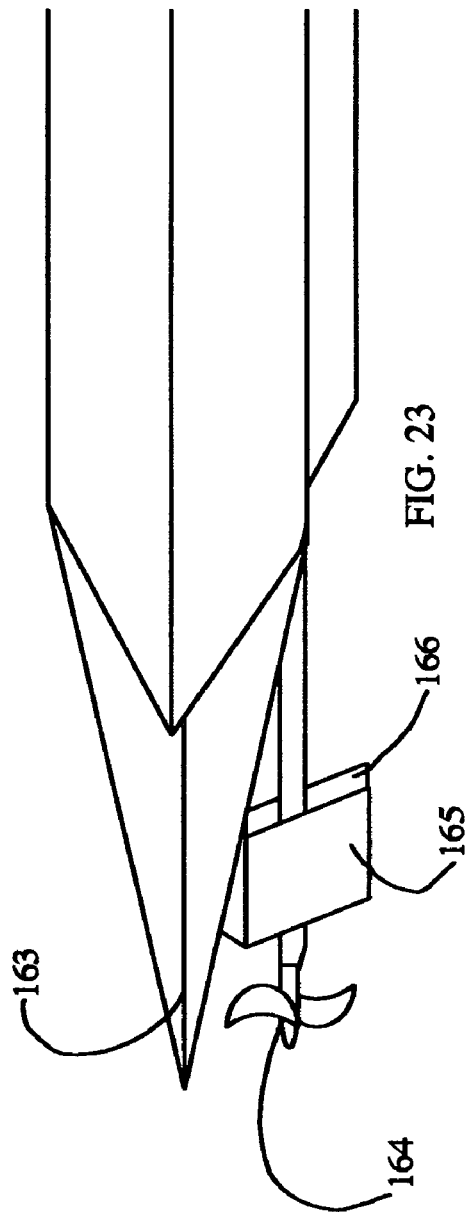

BOW MOUNTED VESSEL PROPULSION SYSTEM

BACKGROUND OF THE INVENTION

Propulsion of waterborne vessels is most often accomplished by positioning one or more propellers or other propulsion means at or near the stern of the vessel. This common arrangement provides the motive force to effectively compel and transport the hull of the vessel forward through the water. However, such vessel movement, especially for high-speed conveyance, produces substantial surface drag along the hull of the vessel. This results in adverse operations, including reduction of speed and loss of fuel efficiency.

While there have been some minimal attempts to employ bow-mounted forward propulsion systems for the forward movement of waterborne vessels, see, for example, U.S. Pat. No. 4,324,551, and planning hulls employing controlled air films, see, for example, U.S. Pat. No. 4,031,841, none of these prior systems have truly resulted in practical, effective, or efficient bow propulsion systems which have addressed the problem of hull surface drag.

SUMMARY OF THE PRESENT INVENTION

It is thus the object of the present invention to address the limitations and disadvantages of prior vessel propulsion systems.

It is an object of the present invention to provide a bow mounted vessel propulsion system which exploits the characteristics of a self-producing hull-lubricating boundary layer of air or air bubbles which are naturally formed during water surface interaction by the hull during vessel movement.

It is a further object of the present invention to provide a bow mounted vessel propulsion system which employs bow mounted propulsion means to generate a hull-lubricating boundary layer of air or air bubbles along the bottom surface of the vessel's hull.

It is another object of the present invention to provide a bow mounted vessel propulsion system which reduces the hull surface drag, resulting in increased fuel efficiency and vessel speed.

It is still another object of the present invention to provide a bow mounted vessel propulsion system which will result in more efficient vessel maneuverability, since steering and propulsion means are combined at the bow section of the vessel, which is the leading edge of travel.

It is a further object of the present invention to provide a bow mounted vessel propulsion system which will result in safer conditions for vessels getting underway by virtually eliminating the bow-rise experienced in typical stern driven vessel configurations, as bow-rise (creating obscured or reduced forward visibility) is considered the primary cause of most recreational boating collisions.

It is an additional object of the present invention to provide a bow mounted vessel propulsion system which will result in safer conditions for water sports activities such as water skiing and wave boarding, since the danger of a rotating propeller is not in the proximity of the onboard and offboard activity.

It is still another object of the present invention to provide a bow mounted vessel propulsion system which will result in safer conditions during rescue maneuvers, landings and off-landings, again, since the danger of a rotating propeller is eliminated during these activities.

These and other objects are accomplished by the present invention, a bow mounted, vessel propulsion system designed to exploit the characteristics of a self-producing vessel lubricating boundary layer of air or air bubbles formed during water surface interaction by the vessel's hull during vessel movement. This boundary layer of air/air bubbles will be produced at the bow of the vessel and, during forward motion, is superimposed upon the surface of the water as the vessel's hull passes over, reducing the frictional drag of the hull as it moves across and through the water. The system has a propulsion means such as a water surface-piercing propeller or water jet nozzles, which will propel the vessel forward and, at the same time, by action of propeller rotation (drawing air into and intermixing) in the water or water jet movement, will create the air bubbles which produce the hull-lubricating phenomenon. The hull is a substantially flat-bottomed planning hull with two linear rails on each lengthwise outer edge of the bottom surface of the hull. The rails extend downward into the water at a sufficient depth to be able to keep the boundary layer of air bubbles from escaping out from the sides of the hull bottom when the vessel is in forward motion.

Novel features which are considered as characteristic of the invention are set forth in particular in the appended claims. The invention, itself, however, both as to its design, construction and use, together with the additional features and advantages thereof, are best understood upon review of the following detailed description with reference to the accompanying drawings.

BRIEF DESCRIPTION OF THE DRAWINGS

FIG. 3 is a top plan view of the vessel shown in FIG. 1.

FIG. 4 is a bottom plan view of the vessel shown in FIG. 1.

FIG. 5 is a top plan view of a single outboard motor powered vessel employing the present invention.

FIG. 6 is a bottom plan view of the vessel shown in FIG. 5.

FIG. 9 is a top plan view of a fixed twin propeller vessel with stern rudder configuration employing the present invention.

FIG. 10 is a bottom plan view of the vessel shown in FIG. 9.

FIG. 11 is a top plan view of a twin propeller vessel with angularly adjustable twin propellers employing the present invention.

FIG. 12 is a bottom plan view of the vessel shown in FIG. 11.

FIG. 15 is a top plan view of a jet powered vessel employing the present invention.

FIG. 16 is a bottom plan view of the vessel shown in FIG. 15.

FIG. 17 is a cross-sectional side representation of the vessel shown in FIG. 15.

FIG. 19 is a side view of a vessel with an angularly adjustable propeller pod unit employing the present invention.

FIG. 20 is a cross-section of the pod unit shown in FIG. 19.

FIG. 22 shows a side view of a vessel with a bow mounted propeller having a bow mounted rudder employing the present invention.

FIG. 23 shows a side view of a vessel with a bow mounted propeller having a bow mounted dual rudder employing the present invention.

DETAILED DESCRIPTION OF THE INVENTION

Figure 1:
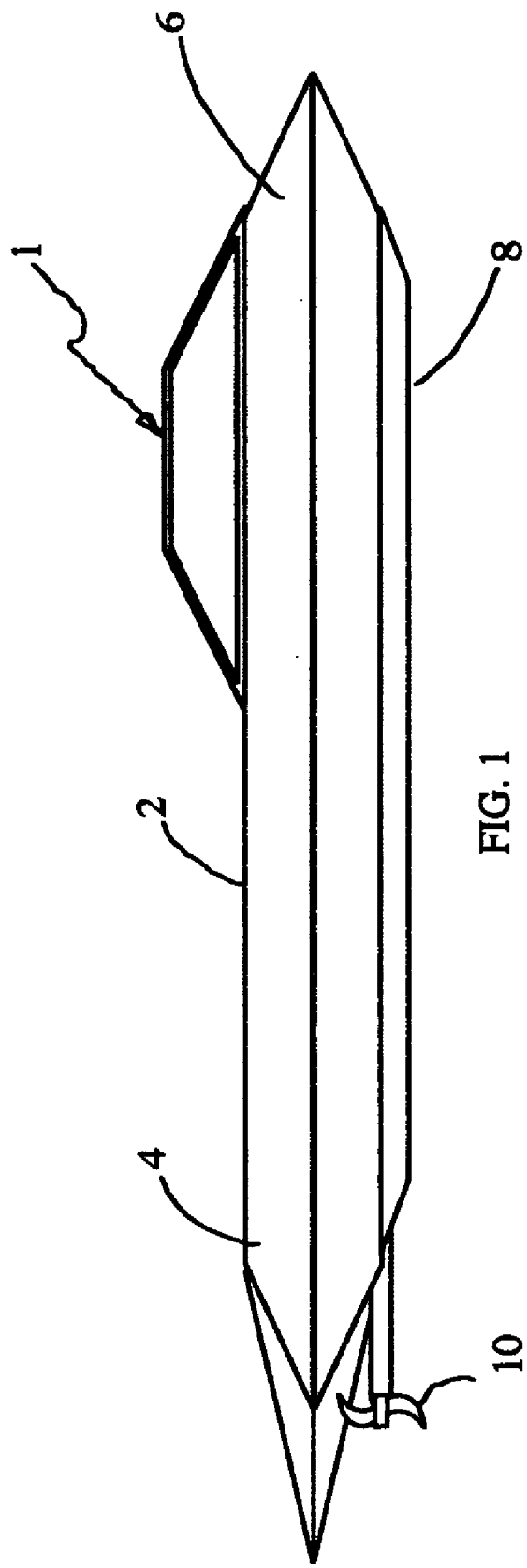
FIG. 1 is a side view of a twin propeller vessel employing the present invention.
Figure 2:
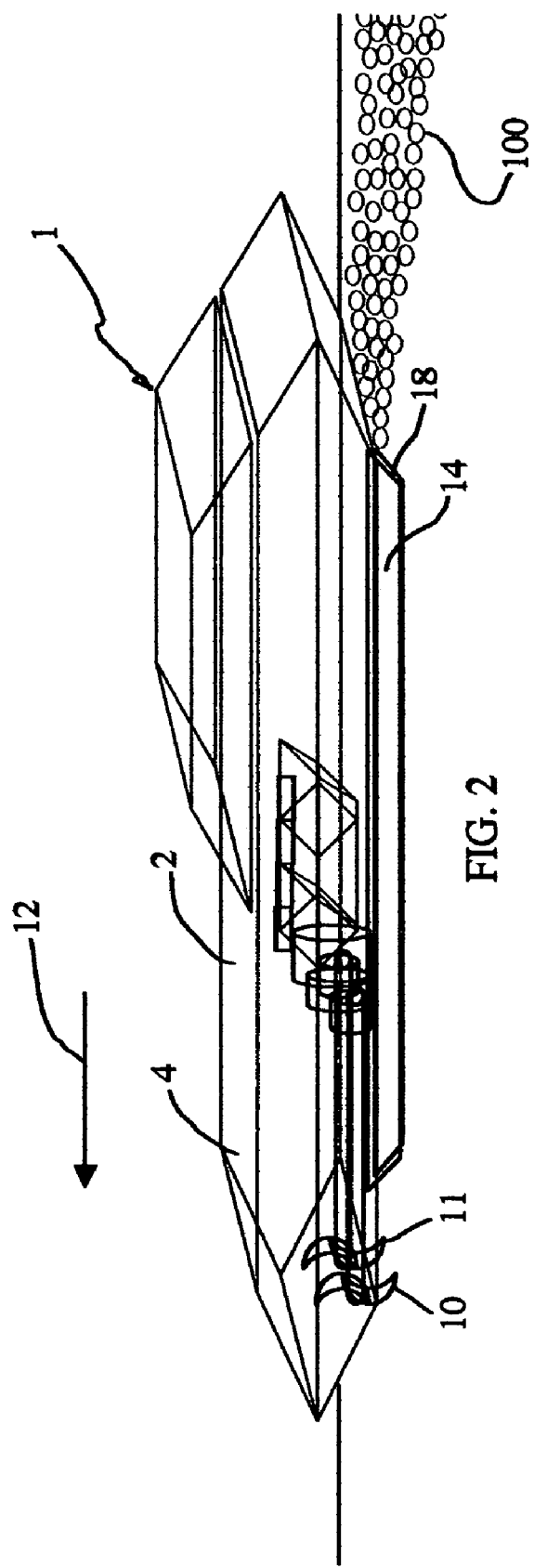
FIG. 2 is an isometric view of the vessel shown in FIG. 1.

Waterborne vessel 1, shown in FIGS. 1–4 comprises hull 2 with bow section 4, stern section 6, and flat bottom surface 8. Propellers 10 and 11 are mounted on bow section 4. Propellers 10 and 11 are water surface-piercing propellers, that is they are positioned such that the upper halves of the propellers, that is the upper portions of the propeller blades as the propellers are rotating, are substantially above the surface of the water. Linear rail members 14 and 16 run longitudinally along the lateral sides of bottom surface 8, forming channeled space 18, between the rail members.

When propellers 10 and 11 are actuated, vessel 1 is propelled in forward direction 12. Since the propellers are partially rotating above the water's surface, they draw air into the ambient water. The air intermixes with the water to create air bubbles 100 at the bow of the vessel. As vessel 1 proceeds in forward direction 12, bubbles 100 travel rearwards directly under bottom surface 8 and are confined within space 18 by rail members 14 and 16. Thus, a layer of air is actually formed under hull 2 by bubbles 100, which are superimposed between bottom surface 18 and the surface of the water as the vessel passes over the bubbles. This moving layer of air/air bubbles beneath vessel 1 materially reduces the frictional drag of hull 2 as it moves across and through the water. The forward motion of vessel 1 thereby results in a self-producing, hull-lubricating boundary air layer comprising bubbles formed due to air and water interaction, caused by the very operation of the propulsion means, here propellers 10 and 11.

FIGS. 5 and 6 show another embodiment of the invention, employing the identical principles of operation. Vessel 21 comprises hull 22 with bow section 24, stern section 26, flat bottom surface 28, and an outboard motor 30 with water surface-piercing propeller 31 mounted within well 33 of bow section 24. Linear rail members 34 and 36 run longitudinally along the lateral sides of bottom surface 28, forming channeled space 38 between the rail members. Air bubbles created at bow section 24 by propeller 31 travel rearward within space 38, producing the moving air layer/bubbles 100 beneath hull 22 as previously described.

Figure 7:
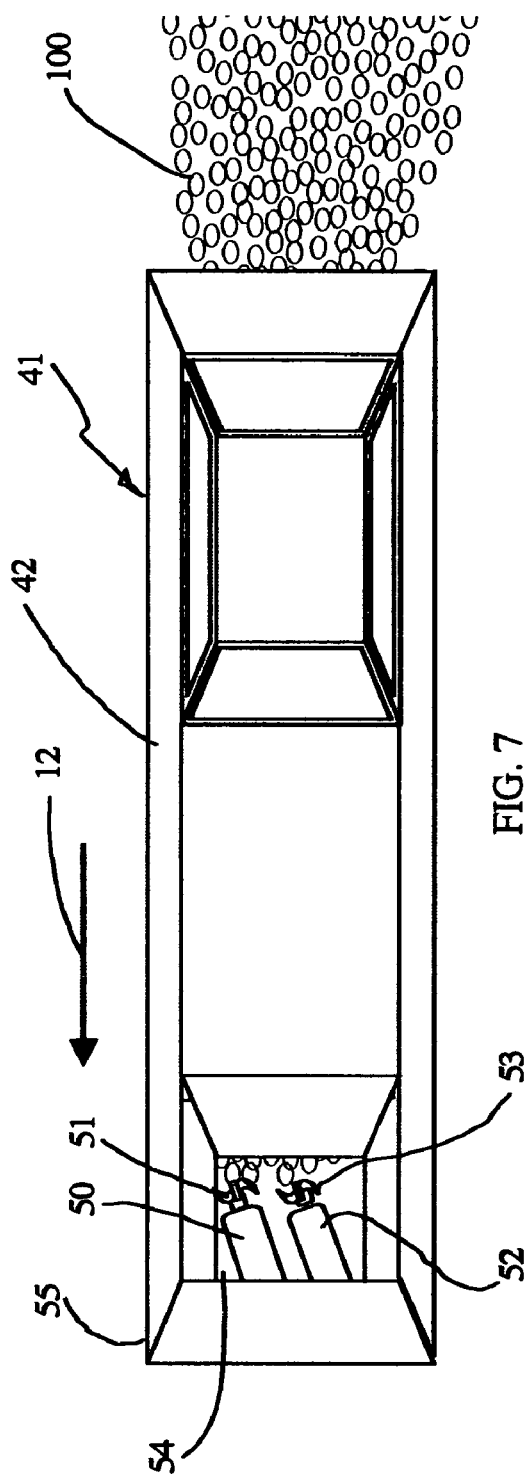
FIG. 7 is a top plan view of an angularly adjustable twin outboard motor vessel employing the present invention.
Figure 8:
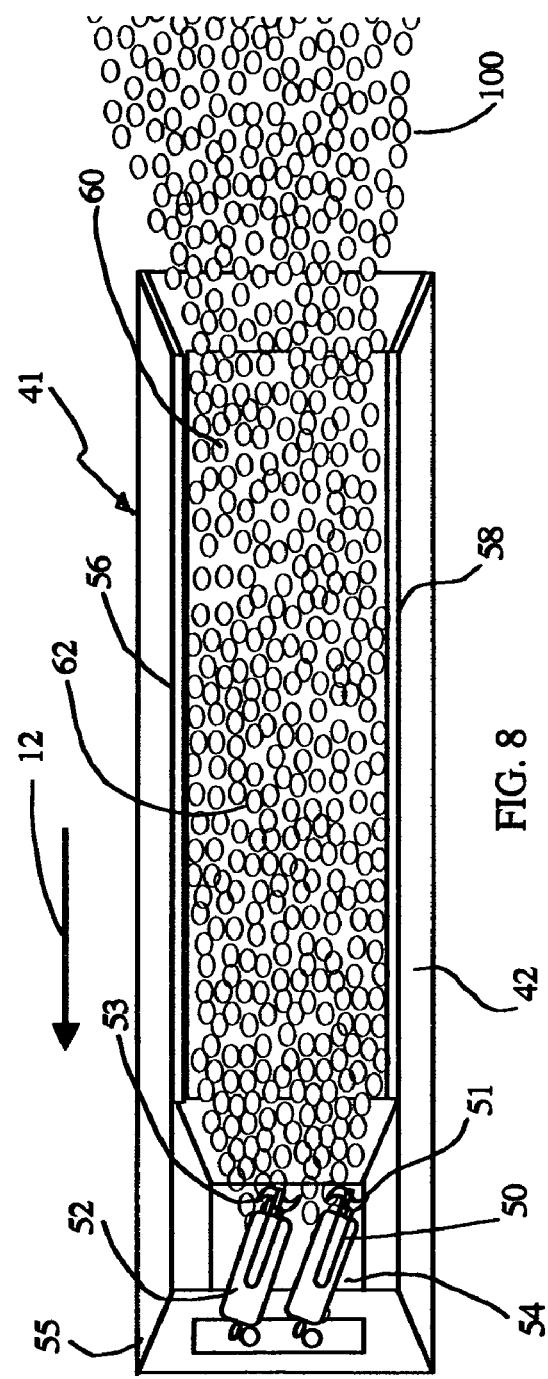
FIG. 8 is a bottom plan view of the vessel shown in FIG. 7.

The embodiment shown in FIGS. 7 and 8 also employs the principles of operation previously described, but shows vessel 41 with hull 42 and with dual angularly adjustable outboard motors 50 and 52, comprising propellers 51 and 53 respectively, located within well 54 at bow section 55. Outboard motors 50 and 52 assist in controlling directional steerage of the vessel. Linear rail members 56 and 58 run longitudinally along lateral sides of bottom surface 60, forming channeled space 62 between the rail members. Air bubbles 100 created at bow section 55 by propellers 51 and 53 as vessel 41 proceeds in forward direction 12, travel rearward within space 62, producing the moving air layer/bubbles 100 beneath hull 42 as previously described.

The embodiment shown in FIGS. 9 and 10 also employs the principles of operation described, but shows vessel 71 with hull 72 and fixed propellers 74 and 75. Linear rail members 76 and 77 run longitudinally along lateral sides of bottom surface 78, forming channeled space 79 between the rail members. Air bubbles 100 created at bow section 73 by propellers 74 and 75 travel rearward within space 79, producing the moving air layer/bubbles 100 beneath hull 72 as previously described. Rudder 80 provides adjustable directional steerage to vessel 71.

The embodiment shown in FIGS. 11 and 12 also employs the principles of operation described, but shows vessel 81 with hull 82 with dual angularly adjustable propellers 84 and 85 located within bow cutout section 86, for controlling directional steerage of the vessel. Linear rail members 87 and 88 run longitudinally along lateral sides of bottom surface 89, forming channeled space 90 between the rail members. Air bubbles 100 created at bow section 83 by propellers 84 and 85 travel rearward within space 90, producing the moving air layer/bubbles 100 beneath hull 82 as previously described.

Figure 13:
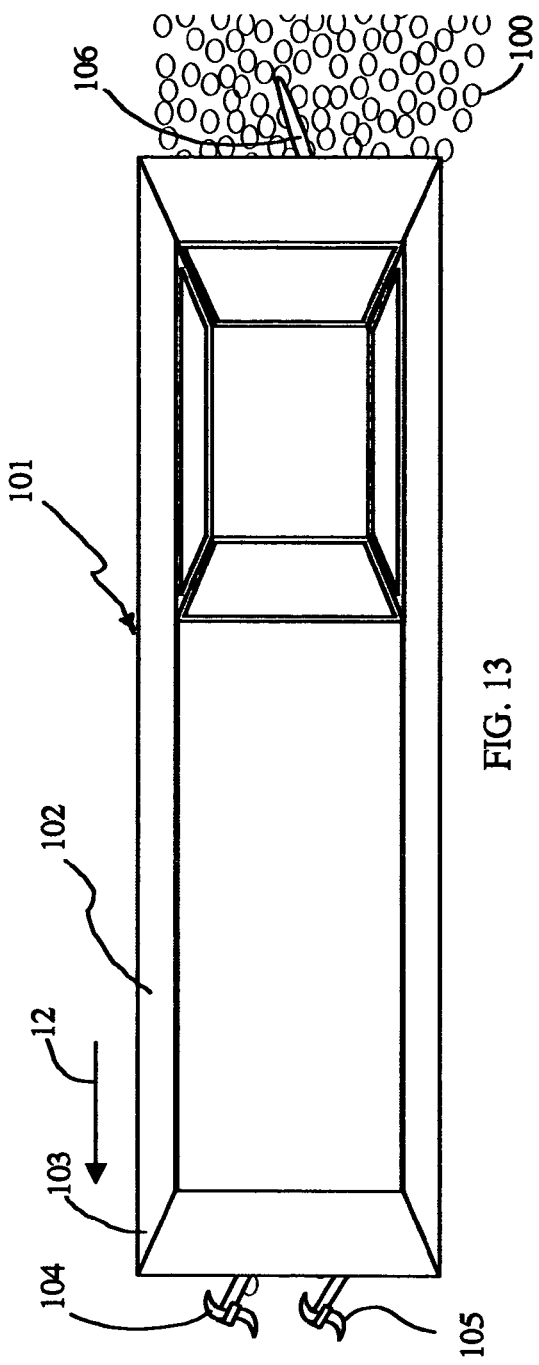
FIG. 13 is a top plan view of a twin propeller vessel with angularly adjustable twin propellers with stern rudder configuration employing the present invention.
Figure 14:
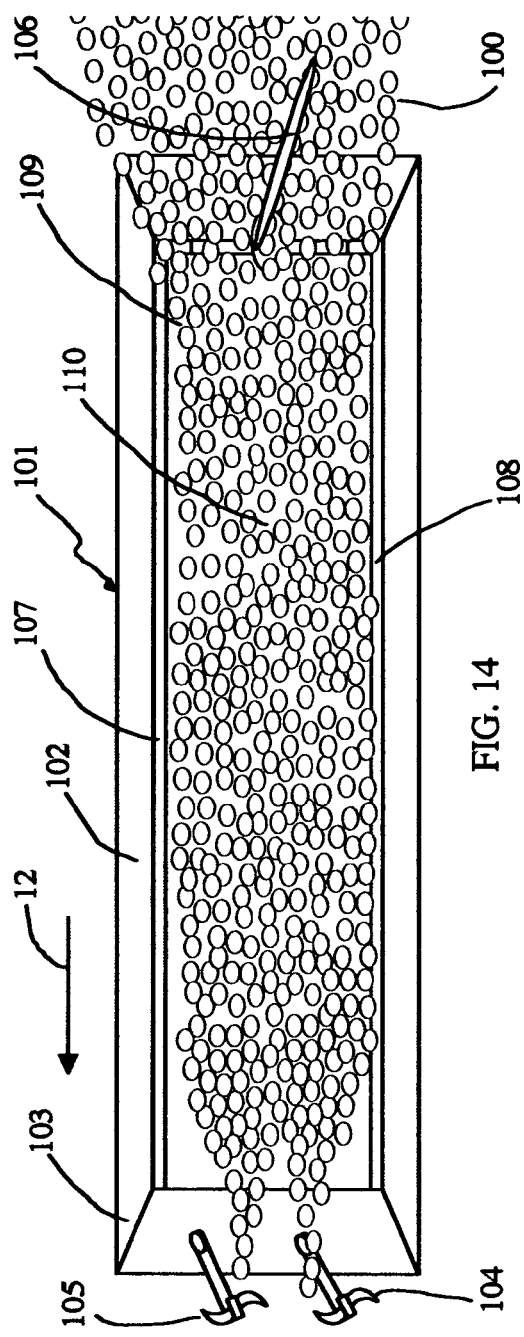
FIG. 14 is a bottom plan view of the vessel shown in FIG. 13.

The embodiment shown in FIGS. 13 and 14 also employs the principles of operation previously described, but shows vessel 101 with hull 102 with dual angularly adjustable propellers 104 and 105 affixed to bow section 103 of the hull. Adjustable propellers 104 and 105 assist stern mounted rudder 106 in controlling directional steerage of the vessel. Linear rail members 107 and 108 run longitudinally along lateral sides of bottom surface 109, forming channeled space 110 between the rail members. Air bubbles 100 created at bow section 103 by propellers 104 and 105 as vessel 101 proceeds in forward direction 12 travel rearward within space 110, producing the air layer/bubbles 100 beneath hull 102 as previously described.

The embodiment shown in FIGS. 15–17 also employs principles of operation previously described, but shows vessel 111 with hull 112 and with jet drive nozzles 114 and 115 extending from bow section 113. Water 116 is supplied to jet nozzles 114 and 115 from a suction located in the lower region of hull 112. Water is then compelled, for instance by impeller 117, to nozzles 114 and 115. Linear rail members 118 and 119 run longitudinally along lateral sides of bottom surface 120, forming channel space 122 between the rail members. Air bubbles 100 created at bow section 113 by jet nozzles 114 and 115, as vessel 111 proceeds in forward direction 12, travel rearward within space 122, producing the air layer/bubbles 100 beneath hull 112 as previously described.

Figure 18:
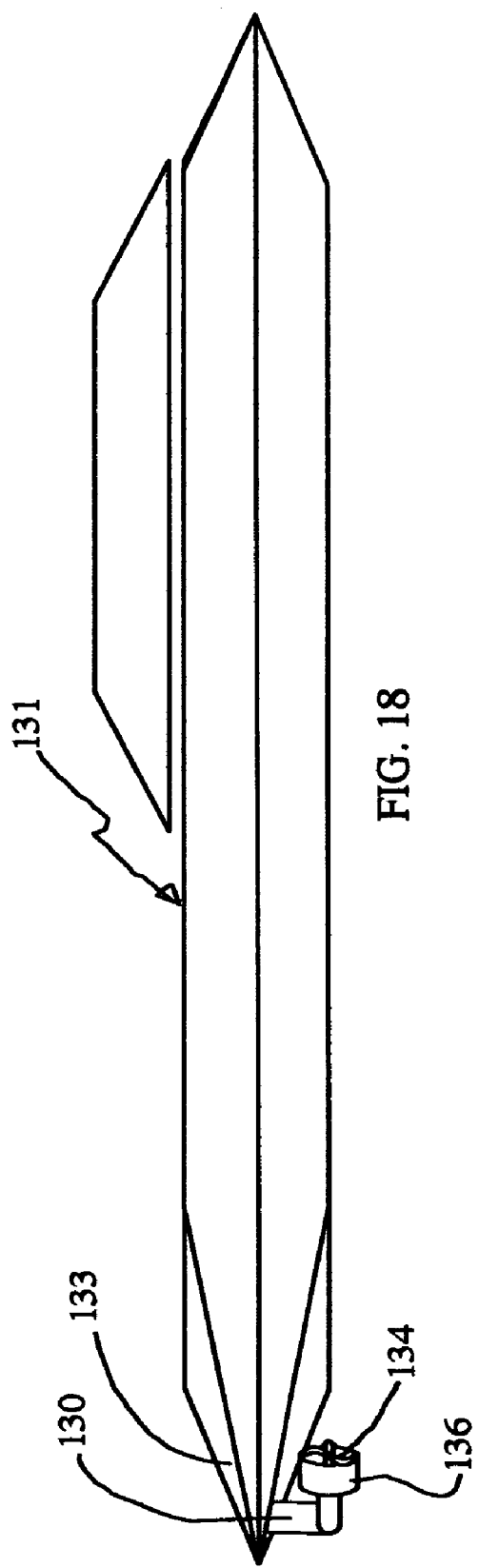
FIG. 18 is a side view of a vessel with a single bow mounted propeller with safety shroud employing the present invention.

FIG. 18 illustrates another bow mounted propeller attachment to be used with a vessel employing a present invention. Bracket 130 is mounted at bow section 133 of vessel 131. Bracket 130 secures propeller 134 which is enclosed by propeller shroud 136. FIGS. 19 and 20 illustrate the use of an angularly adjustable articulating pod configuration 140 on certain vessels employing this invention. Pod 140 is secured to bow section 143 of vessel 141. Propeller 144 is operated through gearing within pod 140, the pod itself being angularly adjustable for controlling directional steerage of vessel 141.

Figure 21:
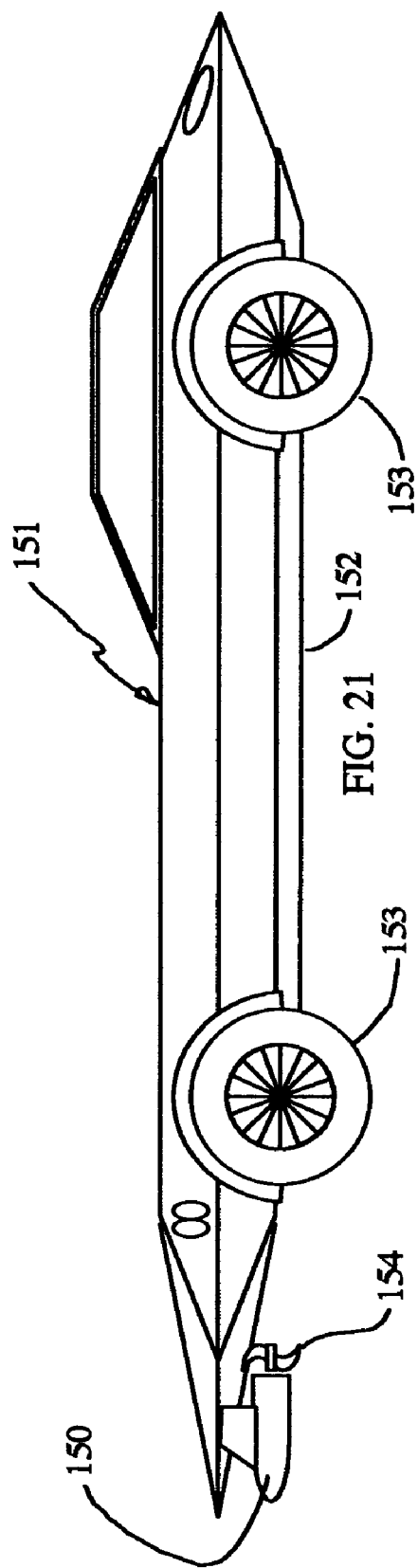
FIG. 21 is a side view of an amphibious vessel employing the present invention.

FIG. 21 shows vessel 151 with hull 152 and pod 150 including propeller 154. Wheels 153 illustrate the usage of the present invention on an amphibious vessel.

FIG. 22 shows the bow of vessel 162, with propeller 164 and bow mounted rudder 166 to assist in vessel steerage. FIG. 23 shows the bow of vessel 163 with propeller 164 using bow mounted dual rudders 165 and 166, also for steerage purposes.

Thus, it can be seen that the vessel propulsion system described in the various embodiments herein represents a simplified and highly efficient means of employing the ambient conditions of air and water to produce a moving layer of air in the form of air containing bubbles, in a boundary layer, to reduce the frictional drag on the hull of a high speed vessel. The very propulsion of the vessel draws air into the water, creating the air bubbles which produce this hull-lubricating phenomenon. This materially reduces the drag on the vessel hull, increasing its speed efficiency through the water. While a number of different bow mounted vessel propulsion systems and vessels have been disclosed herein, the invention is not to be deemed so restricted. It is contemplated that the basic principles of the invention can be adapted and used on the hulls of other different vessels employing various bow mounted propulsion systems.

In addition, certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A waterborne vessel for traversing a body of water, said vessel comprising:
    a hull with a bow and a stern and a bottom surface of given length;
    propulsion means mounted substantially at the bow of the hull for propelling the vessel in a forward direction over the body of water, said propulsion means comprising water surface-piercing propeller means operating partially above the surface of the water, thereby drawing air into ambient water and intermixing the air and water to generate a layer of air bubbles which proceeds rearward of the bow and directly over and underneath substantially the entire length of the bottom surface of the vessel, the propulsion means providing the sole generating source of air bubbles, whereby as the vessel is propelled in a forward direction, the vessel travels substantially over the air bubbles generated solely by the propulsion means.

2. The vessel as in claim 1 wherein the propeller means comprises a single propeller.

3. The vessel as in claim 1 wherein the propeller means comprises multiple propellers.

4. The vessel as in claim 1 wherein the propeller means extends forward of the bow section.

5. The vessel as in claim 1 wherein the propeller means extends aft from the bow section.

6. The vessel as in claim 1 wherein the propulsion means is adjustable to various angles to assist in the steerage of the vessel.

7. The vessel as in claim 1 wherein the layer of air bubbles is confined within a space along the bottom surface of the hull.

8. The vessel as in claim 1 further comprising longitudinally extending rails extending from the bottom surface of the hull, said rails defining a space in which the layer of air bubbles is confined.

9. The vessel as in claim 1 wherein the bottom surface of the hull is substantially flat.

10. A waterborne vessel for traversing a body of water, said vessel comprising:
    a hull of given length having a prow, a stern, and a bottom surface of given length;
    propulsion means mounted directly below the prow of the hull and totally beneath the bottom surface of the hull for propelling the vessel in a forward direction over the body of water, said propulsion means operating partially above and partially below the surface of the body of water, from its location beneath the bottom surface, drawing outside air directly from above the surface into ambient water to intermix the air and water to generate a rearwardly moving layer of intermixed air and water bubbles rearward of the prow and directly over and underneath substantially the entire length of the bottom surface of the hull, the sole generating source of air for the layer of the bubbles, being generated by the operation of the propulsion means above the surface of the body of water, whereby the layer of air and water bubbles reduces the frictional drag over substantially the entire length of the hull as the vessel travels over the bubbles and is propelled in a forward direction over the body of water.

11. The vessel as in claim 10 wherein the propulsion means comprises surface-piercing propeller means operating partially above the water surface for creating the layer of air and water bubbles.

12. The vessel as in claim 11 wherein the propeller means comprises a single propeller.

13. The vessel as in claim 11 wherein the propeller means comprises multiple propellers.

14. The vessel as in claim 10 wherein the propulsion means is adjustable to various angles to assist in the steerage of the vessel.

15. The vessel as in claim 10 wherein the propulsion means comprises water jet means for creating the layer of air and water bubbles.

16. The vessel as in claim 10 wherein the layer of air and water bubbles is confined within a space along the bottom surface of the hull.

17. The vessel as in claim 10 further comprising longitudinally extending rails extending from the bottom surface of the hull, said rails defining a space in which the layer of air and water bubbles is confined.

18. The vessel as in claim 10 wherein the bottom surface of the hull is substantially flat.

* * * * *